United States Patent [19]

Ito

[11] Patent Number: 5,724,925
[45] Date of Patent: Mar. 10, 1998

[54] WIND DIRECTING DEVICE FOR AUTOMOTIVE ENGINE COOLING FAN

[75] Inventor: Haruyasu Ito, West Bloomfield, Mich.

[73] Assignee: Usui Kokusai Sangyo Kaisha Ltd., Japan

[21] Appl. No.: 775,252

[22] Filed: Dec. 30, 1996

[51] Int. Cl.[6] ........................................ F01P 7/10
[52] U.S. Cl. .................. 123/41.49; 180/68.1; 165/41; 165/121
[58] Field of Search .................... 123/41.49; 165/41, 165/51, 121; 180/68.1; 296/180.1

[56] References Cited

U.S. PATENT DOCUMENTS 5,526,872  6/1996  Gielda et al. ........................ 165/41

Primary Examiner—Noah P. Kamen
Attorney, Agent, or Firm—Anthony J. Casella; Gerald E. Hespos; Ludomir A. Budzyn

[57] ABSTRACT

A wind directing device for an automotive engine cooling fan includes a shroud surrounding the fan at the outlet side of a radiator. An undercover is disposed below the shroud. A guide wall is disposed below and near the front side of the automotive engine. The guide wall protrudes downwardly beyond the undercover and is bent or curved backwardly. The wind directing device effectively directs wind backwardly of the engine at both high and low engine speeds. Thus, the wind directing device prevents the recirculation phenomenon, enhances the fan flow efficiency and improves the cooling effect without any intermission.

4 Claims, 2 Drawing Sheets

PRIOR ART

WIND DIRECTING DEVICE FOR AUTOMOTIVE ENGINE COOLING FAN

BACKGROUND OF THE INVENTION

1. Field of the Invention

The present invention relates to a wind directing device for an engine cooling fan which is driven in an automobile or the like by an engine or motor.

2. Description of the Prior Arts

A prior art wind directing device for a cooling fan is constructed as shown in FIGS. 3 or 4. The prior art device includes a shroud 1' surrounding a fan F' at the outlet of a radiator R'; an undercover 3' covering the lower sides of the radiator R' and the front end of an engine E'; and a fence 3", if necessary. Other examples of known wind directing devices include a guide plate disposed around the outer circumference of the fan for directing the wind radially outwardly, as disclosed in Japanese Utility Model Laid-Open No. 103822/1984. Another prior art wind directing device has the rear end edge of the undercover extended downwardly and obliquely backward to form a guide portion, as disclosed in Japanese Utility Model Laid-Open No. 87374/1981.

In recent years, both large-sized cars and small-sized cars have been equipped with air conditioners. Additionally it has been expected that the cooling efficiency of the cooling system will be improved when the automobile is stopped with its engine E' idling or when the automobile is running at a low speed in summer.

In the prior art of FIG. 3, however, the direction of the wind or backward air flow of the fan F' relies exclusively upon the shroud 1'. As a result, a negative pressure region is established near the outer side of the circumferential edge of the open end of the lower portion of the shroud 1' due to the difference in the wind pressure. This pressure difference occurs as the fan F' rotates at a higher speed. As a result, a portion of the wind is sucked into the negative pressure region in the vicinity of the outer side, and then flows around and along the surface of the undercover to the inlet side of the radiator R', as indicated by a double-dotted arrow. This creates a re-suction or recirculation phenomenon. Thus, the prior art has problems that the blow efficiency is inevitably lowered in its entirety, and that the draft resistance is increased by the undercover 3' to lower the air flow rate.

To solve these problems, the undercover 3' has been shortened and equipped with the fence 3" as shown in FIG. 4. The problem of the draft resistance is substantially eliminated, but the flow-around to the radiator inlet side cannot be prevented sufficiently.

In the disclosure of Japanese Utility Model Laid-Open No. 103822/1984, moreover, an annular guide plate is disposed near the outer circumference of the fan so that the draft resistance is significantly increased, and so that the air flow rate decreased accordingly. In the absence of any guide means, on the other hand, the wind leaving the guide plate flows around to the radiator inlet side, and this tendency is particularly prevalent when automobile is stopped or moving slowly.

In the disclosure of Japanese Utility Model Laid-Open No. 87374/1981, on the other hand, the guide portion of the undercover is positioned at a considerable spacing from the outer circumference of the fan. As a result, the wind (or backward air flow) of the fan does not reach the guide portion before its energy is lost. Thus the wind will not be directed obliquely backward, as desired, but will flow around the guide portion to the radiator inlet side so that the recirculation phenomenon cannot be sufficiently prevented.

SUMMARY OF THE INVENTION

The present invention has been conceived in view of the aforementioned problems of the prior art. Accordingly, it is an object of the subject invention to provide a wind directing device for a fan to cool an automotive engine. It is a further object to direct the ventilation effectively backwardly along the guide wall regardless of whether the engine rotation is high or low. Another object of this invention is to eliminate the possibility of the aforementioned recirculation phenomenon and to reduce the draft resistance. The achievement of these objects increases the air flow rate so that the fan blow efficiency can be enhanced to improve the cooling effect at all times.

To achieve the above-specified objects, the present invention provides a wind directing device which comprises a shroud surrounding a fan at the outlet side of a radiator and an undercover disposed below the shroud. A guide wall is disposed below and near the front side of an engine and protrudes downwardly beyond the undercover. The guide wall may be bent or curved backwardly. The wind directing device may further comprise an auxiliary guide wall mounted on the lower side of the rear end of the undercover, which is disposed below the shroud. The auxiliary guide wall terminates above the lower end of the guide wall.

The construction according to the present invention is effective when the automobile is stopped with the engine idling or when the automobile is continuously running at a low speed in summer. During these conditions the wind or backward air flow blown by the rotation of the fan is directed, while it retains a sufficient energy, to and along the inclined guide wall disposed below and near the front side of the engine. Thus the wind or backward air flow is arranged backward from the vicinity of the outer side of the circumferential edge of the open end of the shroud while overcoming the forward flow of re-suction. In other words, an extremely low negative pressure is required for separating the backward air flow having sufficient energy from the guide wall. So long as any special means for establishing such negative pressure is not provided, the flow-around to the inlet side of the radiator can be blocked to prevent the recirculation phenomenon. Since draft resistance is not increased, moreover, a predetermined flow rate can be attained irrespective of the engine rotation so that the fan blow efficiency can be enhanced to improve the cooling effect without any intermission.

DETAILED DESCRIPTION OF THE PREFERRED EMBODIMENTS

Figure 1A:
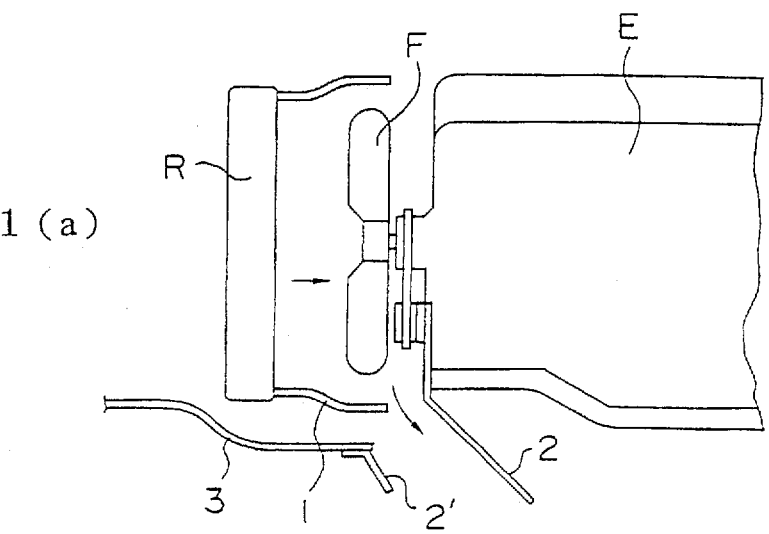
FIGS. 1(a) and 1(b) are partially cut-away sections schematically presenting the state of an engine, in which a wind arranging device for an automotive engine cooling fan according to embodiments of the present invention, and show a bent guide wall at FIG. 1(a) and a curved guide wall at FIG. 1(b)
Figure 1B:
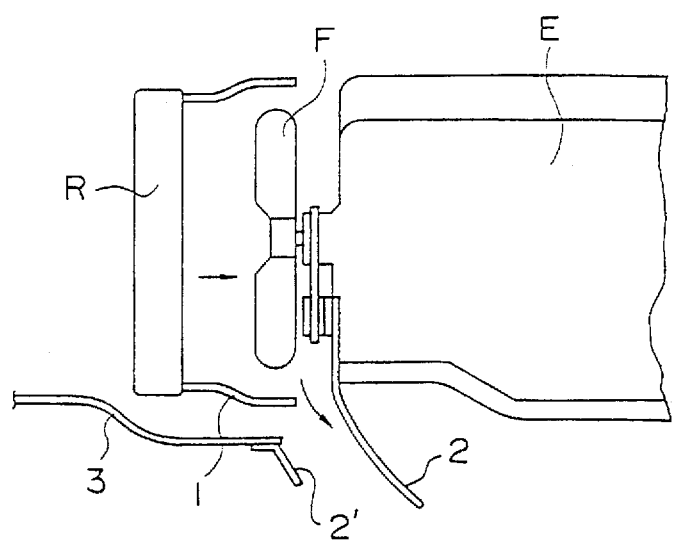
Figure 2:
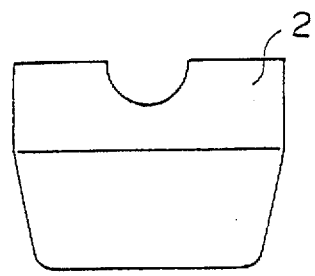
FIG. 2 is a front elevation showing the guide wall solely of FIG. 1(a)
Figure 3:
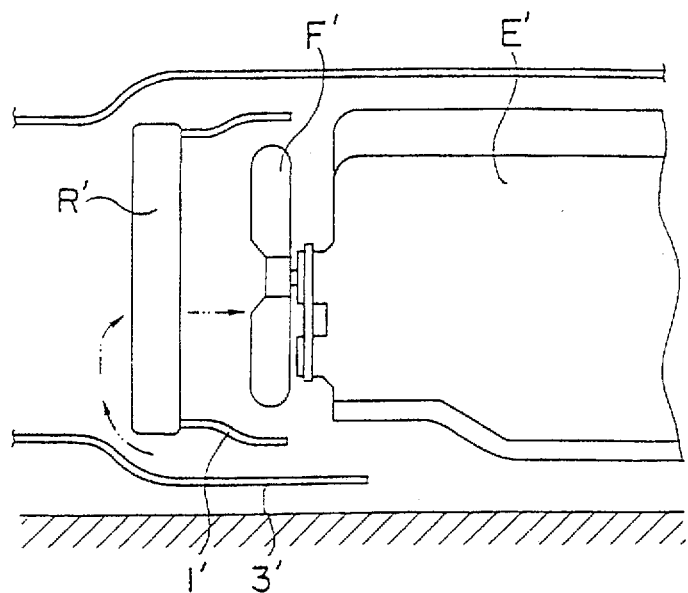
FIG. 3 is a partially cut-away section schematically presenting one example of the engine of the prior art.
Figure 4:
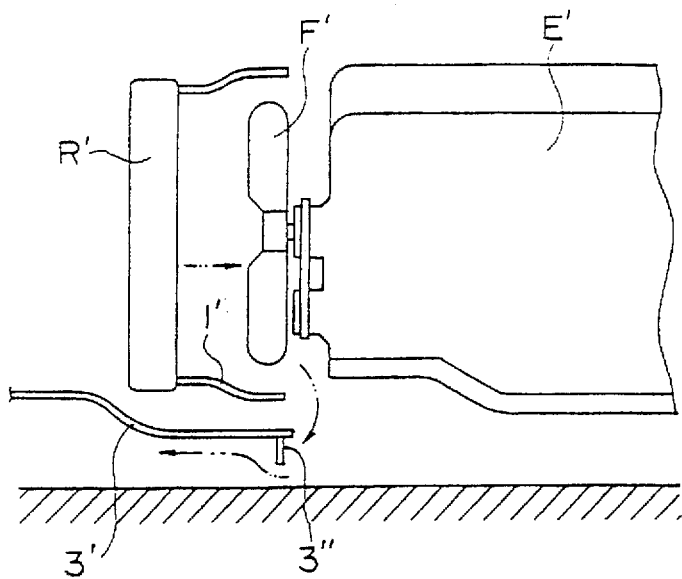
FIG. 4 is similar to FIG. 3 but shows another example of the engine of the prior art.

The embodiments of the present invention will be described in the following with reference to FIGS. 1 and 2.

Reference numeral 1 designates a shroud which is disposed around a fan F at the outlet side of a radiator R, and which is located above an undercover 3.

A guide wall 2 is disposed below and near the front side of an engine E. The guide wall 2 includes a lower end that is bent backwardly, as shown in FIG. 1(a)., or that is curved backwardly as shown in FIG. 1(b). The lower end of the guide wall 2 extends downwardly below the undercover 3 and through the backward bend or curve shown in FIGS. 1(a) and 1(b).

A planar auxiliary guide wall 2' may be mounted on the lower side of the rear end of the undercover 3, which is disposed below the shroud 1. The planar auxiliary guide wall 2', if present, terminates at a relative height above the lower end of the guide wall 2. These two guide walls 2 and 2' cooperate such that the fan blow efficiency is further improved.

The lower end of the guide wall 2 terminates below the lower end of the undercover 3 and below the lower end of the auxiliary guide wall 2'. Thus the air flow is guided along the guide wall 2 to its lower end. At this point the air flow is below the lower end of the undercover 3 and below the auxiliary guide wall 2'. Hence the air flow is prevented from recirculating to the radiator R along the faces of the undercover 3 and the auxiliary guide wall 2' as indicated by the solid arrows in FIGS. 1(a) and 1(b).

The wind directing device for the automotive engine cooling fan, according to the present invention, is effective when the vehicle is stopped with the engine idling or when the vehicle is continuously running at a low speed in summer. In particular, wind that retains sufficient energy is guided by the guide wall 2 disposed below and near the front side of the engine E and near the outer circumferential portion of the fan F. The wind is further guided along the guide wall (2) to the back of the engine by a high static pressure. As a result, the recirculation phenomenon of the prior art can be prevented, and the wind can be blown at a predetermined flow rate to enhance the fan blow efficiency irrespective of the engine rotation state, thereby improving the cooling effect without any intermission.

I claim:

1. A wind directing device for use with a cooling fan mounted at a front end of an automotive engine and a radiator spaced forwardly from said fan such that said fan draws cooling air through said radiator, said wind directing device comprising:

a shroud extending from said radiator and into surrounding relationship to said fan;

an undercover disposed in spaced relationship below said radiator and said shroud; and a guide wall mounted to the front of said engine and in spaced relationship to said shroud and said undercover, said guide wall projecting rearwardly from the front end of the engine and downwardly beyond the shroud and the undercover.

2. The wind directing device of claim 1, wherein the guide wall is bent rearwardly and downwardly from the front of the engine.

3. The wind directing device of claim 1, wherein the guide wall is curved rearwardly and downwardly from the front of the engine.

4. The wind directing device of claim 1, wherein the undercover includes a rear end and a lower side, said wind directing device further comprising an auxiliary guide wall mounted on the lower side of the undercover at the rear end thereof, said guide wall terminating at a location lower than the auxiliary guide wall.

* * * * *